Aug. 11, 1942.  T. C. ANDRIANOFF  2,292,595
SAW GRINDER
Filed Nov. 29, 1940
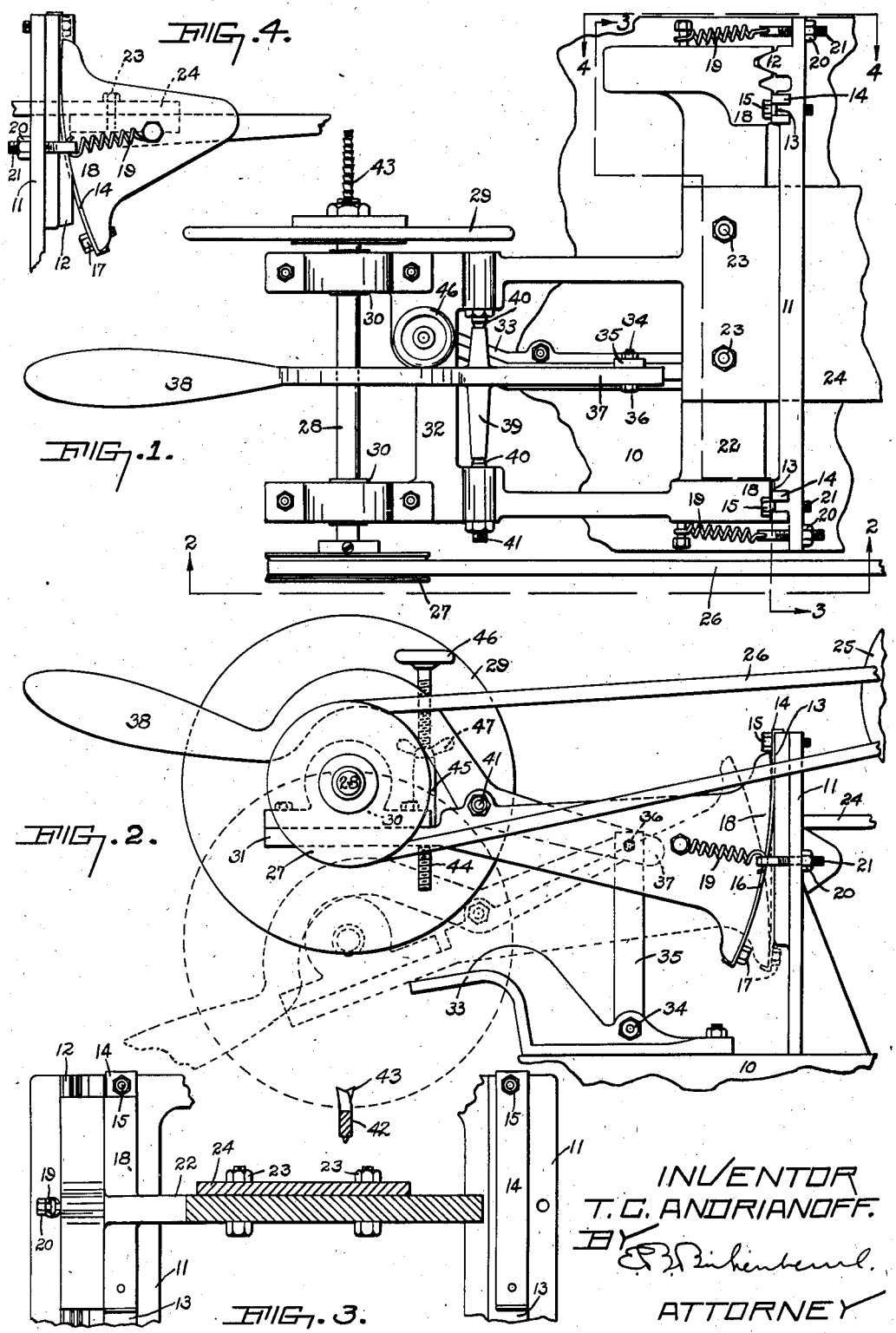
INVENTOR
T. C. ANDRIANOFF.
BY
ATTORNEY Patented Aug. 11, 1942

2,292,595

UNITED STATES PATENT OFFICE 2,292,595

SAW GRINDER

Theodore C. Andrianoff, Portland, Oreg., assignor to Armstrong Manufacturing Company, Portland, Oreg.

Application November 29, 1940, Serial No. 367,797

6 Claims. (Cl. 76—40)

This invention relates generally to a saw sharpening and gumming machine and particularly to an improved form of support for the grinder unit.

The main object of this invention is to construct an improved form of support for the grinding wheel shaft having a rocker action which will cause the axis of the grinder shaft to move in a vertical plane and whereby the action produced will be smooth and uniform as well as precise and whereby such action will be obtained at a minimum cost for producing and assembling the parts involved.

The second object is to produce a device of the class described wherein slides and gearing are entirely eliminated and wherein wear produced by such friction is also eliminated.

These and other objects are accomplished in the manner set forth in the following specification as illustrated in the accompanying drawing, in which:

Fig. 1 is a fragmentary plan of a saw grinder showing the parts involved in this invention.

Fig. 2 is a fragmentary elevation of the portion of the saw containing my invention, taken along line 2—2 in Fig. 1.

Fig. 3 is a fragmentary section taken along the line 3—3 in Fig. 1.

Fig. 4 is a fragmentary section taken along the line 4—4 in Fig. 1.

Referring in detail to the drawing there is shown a base 10 from which projects upwardly the vertical standard 11 on one side of which is formed a vertical V shaped track 12 and a pair of spaced vertical tracks 13 whose rolling surfaces occupy the same straight vertical plane. To the upper end of each track 13 is secured a flexible strap 14 by means of a bolt 15, the intermediate portion 16 of the strap 14 normally being in register with and in contact with its respective track 13, secured to the lower end of each strap 14 by means of a bolt 17 is a rocker 18 which is urged into continual contact with the strap portion 16 by means of a spring 19, the tension of which may be controlled by the nut 20 on the eyebolt 21 to which the spring 19 is attached.

The rockers 18 are united by the cross web 22 which web has secured thereto, by means of the bolts 23, a plate 24 on which is mounted the operating motor 25 whose belt 26 runs over the pulley 27 on the shaft 28 of the grinding wheel 29. The shaft 28 journals in the standards 30 which are secured on the ends 31 of the rockers 18. It is desirable to provide a cross tie 32 between the ends 31.

On the base 10 is secured a bracket 33 to which is hinged, by means of a bolt 34 a link 35 to the upper end of which is secured by means of a bolt 36, the end 37 of a hand lever 38 whose intermediate hubs 39 are held between the points 40 of the bearing screws 41 which are threaded through the members 31.

In order to illustrate the purpose of this invention, there is shown a portion of a saw 42 whose teeth 43 are to be sharpened. In order to limit the downward movements of the grinding wheel, there is provided a screw 44 which is threaded through the post 45 on the cross tie 32 and provided at its upper end with a hand wheel 46, but which may be easily turned.

A wing nut 47 is provided for locking the screws 44 in a desired position. The operation of the device is as follows:

Assuming that a saw 42 is suitably held in position by means not shown and that the screw 44 is suitably adjusted and that other means, which are not a part of this invention, for indexing the teeth 43, are also provided, it is only necessary for the operator to bear downwardly on the lever 38 which causes the rocker 18 to rock downwardly along the strap 16 and since the curvature of the rocker 18 centers on the axis of the wheel 29, it follows that the movement of the axis of the wheel 29 must be in a vertical plane, that is, a vertical movement of the wheel 29 is obtained and insured without any frictional slides or gearing.

It is obvious that the position of the track 12 is merely to insure alinement of the grinding wheel 29 as it moves vertically. The only function of the springs 19 is to insure the rockers 18 bearing directly against the straps 16.

While I have thus illustrated and described my invention, it must be understood that it is not my intention to limit myself to the form of the device illustrated herein but I intend to cover all such forms and modifications thereof as follow fairly in the appended claims.

I claim:

1. In a device of the class described, the combination of a vertical track member, a rocker arm having a rounded end adapted to rock along said track, a flexible strap interposed between said track and rocker arm, the upper end of said strap being attached to said track and the lower end of said strap being attached to said rocker, and a grinding wheel mounted on said rocker arm, the axis of said wheel passing through the center of curvature of the rounded end on said arm.

2. In a device of the class described, the combination of a vertical track, a flexible strap disposed against said track and secured to its upper end, a curved rocker disposed against said strap and secured to its lowermost end, a spring for urging said rocker toward said track and a grinding wheel mounted on said rocker with the axis of said wheel coinciding with the axis of curvature of said rocker.

3. In a device of the class described, the combination of a vertical track, a flexible strap disposed against said track and secured to its upper end, a curved rocker disposed against said strap and secured against its rockers, and a spring for urging said rocker toward said track, means for preventing lateral movement of said rocker on said track and a grinding wheel mounted on said rocker with the axis of said wheel coinciding with the axis of curvature of said rocker.

4. In a device of the class described, the combination of an upright frame having a pair of flat vertical tracks formed thereon in horizontally spaced relationship, a flexible strap secured at the upper end of each track and extending downwardly along the respective tracks, a pair of curved rockers engaging said straps opposite said tracks, the lower end of each strap being secured to the lower end of a rocker, means for holding both rockers in rigid relationship, a grinding wheel supported by said rockers having the axis thereof coinciding with the axis of curvature of said rockers, means for counter-balancing said grinding wheel and a lever for moving said wheel downwardly against said counter-balancing means.

5. The apparatus as described in claim 4 together with means for holding said rockers against lateral movement with relation to their respective tracks.

6. The apparatus as described in claim 4 together with variable means for limiting the movement of said grinding wheel in a downward direction.

THEODORE C. ANDRIANOFF.